United States Patent [19]

White et al.

[11] Patent Number: 5,378,752
[45] Date of Patent: Jan. 3, 1995

[54] INK ERADICATOR SYSTEM INCLUDING FILM FORMING POLYMER

[75] Inventors: Donald P. White, Norwell; Rachel M. Loftin, Halifax, both of Mass.

[73] Assignee: The Gillette Company, Boston, Mass.

[21] Appl. No.: 972,268

[22] Filed: Nov. 5, 1992

[51] Int. Cl.$^6$ .................. C08J 3/20; C08K 3/30; C08L 33/12

[52] U.S. Cl. ..................... 524/418; 523/161

[58] Field of Search .................. 523/161; 524/418

[56] References Cited

U.S. PATENT DOCUMENTS

| | | | |
|---|---|---|---|
| 3,804,774 | 4/1974 | Betts et al. | 252/301.2 R |
| 3,886,083 | 5/1975 | Laxer | 252/301.2 R |
| 3,928,226 | 12/1975 | McDonough et al. | 252/301.2 R |
| 4,015,131 | 3/1977 | McDonough et al. | 250/461 R |
| 4,150,997 | 4/1979 | Hayes | 106/15.05 |
| 4,153,593 | 5/1979 | Zabiak et al. | 260/29.6 ME |
| 4,156,657 | 5/1979 | Lin | 252/188.3 R |
| 4,186,020 | 1/1980 | Wachtel | 106/22 |
| 4,213,717 | 7/1980 | Lin | 401/18 |
| 4,227,930 | 10/1980 | Lin | 106/19 |
| 4,228,028 | 10/1980 | Lin | 252/188.3 R |
| 4,243,694 | 1/1981 | Mansukhani | 427/14.1 |
| 4,252,845 | 2/1981 | Griffiths et al. | 427/273 |
| 4,681,471 | 7/1987 | Hayduchok et al. | 401/34 |
| 5,006,171 | 4/1991 | Mecke et al. | 106/21 |
| 5,059,244 | 10/1991 | King et al. | 106/21 |
| 5,091,006 | 2/1992 | Sarada et al. | 106/22 |
| 5,135,569 | 8/1992 | Mathias | 106/22 |

FOREIGN PATENT DOCUMENTS

| | | |
|---|---|---|
| 0032653 | 7/1981 | European Pat. Off. . |
| 80730077.7 | 7/1981 | European Pat. Off. . |
| 0304887B1 | 5/1992 | European Pat. Off. . |
| 0322805B1 | 5/1992 | European Pat. Off. . |
| 1111760 | 7/1961 | Germany . |
| 2216951 | 10/1973 | Germany . |
| 2834459A1 | 6/1980 | Germany . |
| 2616259C3 | 12/1981 | Germany . |
| 3919588 | 12/1989 | Germany . |

*Primary Examiner*—Paul R. Michl
*Assistant Examiner*—U. K. Rajguru
*Attorney, Agent, or Firm*—Fish & Richardson

[57] ABSTRACT

An ink eradicator system is provided which includes an eradicator fluid that includes a reducing agent, a film-forming polymer and water.

10 Claims, No Drawings

INK ERADICATOR SYSTEM INCLUDING FILM FORMING POLYMER

BACKGROUND OF THE INVENTION

This invention relates to ink eradicator systems.

Eradicator fluids which contain a reducing agent that will cause the dye component of an ink to be reduced to a colorless form are commonly used, e.g., in the graphic arts, to correct ink markings. The reducing agent used is generally a reducing sulfur compound, e.g., a sulfite salt. These fluids often suffer from the disadvantage that a new marking, made over the eradicator fluid, will also disappear due to the presence of the reducing agent.

Many solutions to this problem have been proposed. For example, in some instances a second, different ink has been used to write over the eradicator fluid. Others have proposed that the proportion of the sulfite salt in the eradicator fluid be reduced.

European Patent Application No. 0032652 teaches an eradicator fluid in which the sulfite salt reducing agent is replaced with a basic nitrogen compound. As discussed in U.S. Pat. No. 5,006,171, the resulting eradicator fluids are typically highly alkaline, which may cause damage to the paper structure such that upon overwriting the paper fibers may be pulled out.

SUMMARY OF THE INVENTION

In general, the invention features an ink eradicator system including an eradicator fluid that includes a reducing agent, a film-forming polymer and water. The system also includes an ink containing a colorant that is reduced by the reducing agent to colorless form. The eradicator fluid of the invention readily removes markings made with an ink containing a reducible colorant, and allows a mark to be made over the eradicator fluid almost immediately (e.g., within 20 seconds) after the eradicator fluid is applied. Advantageously, the mark can be made using most conventional inks, including the same ink that has been eradicated, without the eradicator fluid causing the mark to disappear, even when the user has applied excessive amounts of the eradicator fluid, e.g., by making repeated passes over the mark to be eradicated, using the eradicating instrument in a manner similar to an eraser.

In one aspect, the eradicator fluid includes a reducing sulfur compound, a film-forming polymer and water.

In another aspect, the eradicator fluid includes a reducing agent, at least 8% and preferably at least 15% by weight of a film-forming polymer, and water.

In preferred embodiments, the film-forming polymer is an acrylic polymer, preferably provided in the form of an emulsion. Preferred acrylic polymers include polymethacrylates, polyacrylates and mixtures thereof. A particularly preferred polymer is RHOPLEX AC-261, a blend of butylacrylate and methylmethacrylate copolymers in the form of an emulsion, commercially available from Rohm & Haas. Other polymers which may be used include water-soluble salts of styrene maleic anhydride copolymers and water-soluble acrylic resins.

A preferred eradicator fluid includes from about 0.5 to 4.0 weight percent reducing agent, from about 5 to 40 weight percent film-forming polymer (on a solids basis), and from about 55 to 95 weight percent water.

In another aspect, the invention features a pen having a tip at each end, and a pair of reservoirs. Each reservoir extends from each tip towards the center of the pen. One of the reservoirs contains an eradicator fluid of the invention, and the other contains an ink containing a colorant capable of being reduced by the eradicator fluid.

In a further aspect, the invention features a pen system which includes a plurality of pens, one pen containing an eradicator fluid of the invention, and the remaining pens containing one or more inks of the invention. If more than one ink-containing pen is provided, the pens preferably contain inks having different colors. Preferably, the pens are ball point pens. In one preferred embodiment, each ball point pen includes a tubular member for fluid communication with a reservoir, a socket, having a seat, at one end of the member, an interior wall surface extending from the seat, a rim disposed at the end of the interior wall surface opposite the seat, and a spherical ball that is disposed in the socket, rotatably engagable with the seat and captured by the rim.

Other features and advantages of the invention will be apparent from the Description of the Preferred Embodiments thereof, and from the claims.

DESCRIPTION OF THE PREFERRED EMBODIMENTS

The preferred embodiments include an eradicator fluid containing a reducing sulfur compound, at least 15% of a film-forming polymer, and water, and an ink containing a dye which can be reduced to colorless form by the reducing compound.

Preferred reducing sulfur compounds include sulfite salts, e.g., sodium sulfite. It is preferred that the eradicator fluid contain at least about 0.5 weight percent and not more than about 4 weight percent of the sulfur compound. Lower levels of the compound will not effectively reduce the dye in the ink, while higher levels will cause the fluid to gel rapidly and are difficult to dissolve. It is more preferred that the fluid contain from about 1 to 3 weight percent of the sulfur compound, with about 2 percent generally most preferred. Sulfite salts are commercially available from a number of suppliers, e.g., photographic grade sodium sulfite may be obtained from Eastman Chemical Co. While sulfur compounds are preferred, other reducing agents can be used, such as basic nitrogen compounds, phosphite salts and sodium carbonates.

Suitable film-forming polymers include those which dry quickly, when the eradicator fluid is applied in a thin film, to form a non-tacky water impermeable film. Such polymers typically have a high rate of water release. Preferred polymers are acrylic polymers, more preferably polymethacrylates and polyacrylates. Preferred polymers are RHOPLEX acrylate polymer emulsions, commercially available from Rohm & Haas; a particularly preferred polymer is RHOPLEX AC-261. Other polymers which may be used include water-soluble salts of styrene maleic anhydride copolymers, e.g., SMA resins, commercially available from ATOCHEM, and water-soluble acrylic resins available from S. C. Johnson. Preferably the polymer is provided in the form of an emulsion, or is a water-soluble salt, for ease in incorporating the polymer into the fluid. It is preferred that the eradicator fluid contain at least about 15 weight percent, and not more than about 40 weight percent of the polymer. At lower levels, a marking formed over the eradicator fluid will still tend to fade or disappear, while at higher levels (greater than about 40 percent) the fluid may coagulate or be excessively thick.

More preferably, the fluid contains from about 20 to 30 weight percent of the polymer.

Preferred eradicator fluids contain sufficient water to provide a viscosity of from about 1 to 10 cps. The eradicating fluids typically contain from about 55 to 95 percent, more preferably 65 to 85 percent water.

The eradicator fluids can include other ingredients, such as bacteriocides and buffers.

The eradicator fluids generally can be prepared by blending the ingredients under conditions of moderate shear. It is preferred that the reducing agent be dissolved in part or all of the water, then any optional components, e.g., bacteriocide, added to the resulting solution, then the emulsion added last.

Suitable inks are those which contain dyes which can be reduced to colorless form by the selected reducing agent, i.e., when the reducing agent is a sulfur compound, dyes which can be reduced by the sulfur compound, for example triaryl methane dyestuffs. Combinations of dyes and reducing agents which will allow the ink to be successfully eradicated can be easily determined by one skilled in the art. Preferred inks include solvent based ball point inks, such as those commercially available from Dokumental, W. Germany, under the tradename DOKUMENTAL R080 inks.

The preferred inks and eradicator fluids can be used in standard ball point pens, e.g. pens which include a tubular member for fluid communication with a reservoir (either a fiber or hollow reservoir); a socket, having a seat, at one end of the member; an interior wall surface extending from the seat; a rim disposed at the end of the interior wall surface opposite the seat; and a spherical ball that is disposed in the socket, rotatably engagable with the seat and captured by the rim.

Preferably, the preferred inks are supplied in conventional ball point pens, as described above, while the eradicator fluids are supplied in conventional capillary feed markers that preferably include a polyolefin fiber tip (or nib) connected to a reservoir, preferably also made of polyester fiber. Other types of nibs, e.g., acrylic fibers, may be used.

In one embodiment, the ink and the eradicator fluid are supplied in separate pens. If desired, several ink-containing pens may be provided, each pen containing an ink having a different color.

In another embodiment, the ink and the eradicator fluid are supplied in a single pen, containing a reservoir for each. Each reservoir may be either a hollow or fiber reservoir. The two reservoirs are surrounded by a tubular member, e.g., a polypropylene barrel. If the pen is a marker, it includes nibs at opposite ends, each nib being covered by a cap. Alternatively, if it is a ball point pen it includes a ball and socket structure, as described above and as is well known in the art, at each end. If desired, the pen may be a marker at one end, containing the eradicator fluid, and a ball point pen at the other end, containing the ink. Reservoirs are available from, e.g., American Filtrona Co. of Richmond, Va., or Baumgartner, Germany. Nibs are available from e.g., Aubex Co. of Tokyo, Japan, Teibow or Porex.

The following example illustrates the invention.

EXAMPLE

An eradicator fluid was prepared by mixing 2 parts sodium sulfite, 3 parts triethanolamine (a stabilizer and pH adjuster), 0.1 part 2-chloroacetamide (a preservative), 50 parts of RHOPLEX AC-261 (a 50% solids emulsion of an acrylate polymer in water), and 50 parts deionized water. The fluid was applied to a dried marking formed with DOKUMENTAL R080 ball point ink. The marking disappeared after about 1 second. About 10 seconds after the marking disappeared, a new, corrective marking was formed with the same ink over the eradicator fluid. This marking did not disappear.

Other embodiments are within the claims.

We claim:

1. An ink eradicator system comprising an eradicator fluid comprising a reducing sulfur compound, from about 15 to 40 weight percent of a film-forming polymer, said polymer being provided in the form of an emulsion, and water, and
    an ink comprising a colorant that is capable of being reduced by said reducing compound.

2. An ink eradicator system comprising
    an eradicator fluid that includes a reducing agent, at least 8% of a film-forming polymer, and water, and
    an ink comprising a colorant that is capable of being reduced by the reducing agent.

3. A system of claims 1 or 2 wherein the film-forming polymer is an acrylic polymer.

4. A system of claim 3 wherein the acrylic polymer is selected from the group consisting of polymethacrylates, polyacrylates and mixtures thereof.

5. A system of claim 4 wherein the acrylic polymer is a butylacrylate/methylmethacrylate blend.

6. A system of claim 1 or 2 wherein the eradicator fluid includes from about 0.5 to 4.0 weight percent reducing agent, from about 15 to 40 weight percent film-forming polymer, and from about 55 to 95 weight percent water.

7. A system of claim 1 wherein said sulfur compound is a sulfite salt.

8. A system of claim 1 or 2 wherein said colorant is a dye.

9. A system of claim 1 or 2 wherein said colorant is reduced to colorless form.

10. A system of claim 2 wherein said reducing agent is a sulfite salt.

* * * * *